United States Patent [19]

Bretthauer et al.

[11] Patent Number: 4,663,764
[45] Date of Patent: May 5, 1987

[54] METHOD AND APPARATUS FOR ELECTRICALLY BALANCING THREE-PHASE ARC DISCHARGE FURNACES

[75] Inventors: Karlheinz Bretthauer; Hans-Dietrich Obenauf, both of Clausthal-Zellerfeld, Fed. Rep. of Germany

[73] Assignee: Fried. Krupp Gesellschaft mit beschränkter/Haftung, Essen, Fed. Rep. of Germany

[21] Appl. No.: 847,732

[22] Filed: Apr. 3, 1986

[30] Foreign Application Priority Data

Apr. 3, 1985 [DE] Fed. Rep. of Germany ....... 3512177

[51] Int. Cl.⁴ .............................................. H05B 7/148
[52] U.S. Cl. ..................................................... 373/104
[58] Field of Search ................ 373/104, 105, 106, 102

[56] References Cited

U.S. PATENT DOCUMENTS 3,431,344   3/1969   Borrebach ........................... 373/105
3,493,664   2/1970   Kapell ................................. 373/105
3,597,518   8/1971   Roberts ............................... 373/105

Primary Examiner—Roy N. Envall, Jr.
Attorney, Agent, or Firm—Spencer & Frank

[57] ABSTRACT

A method and apparatus for electrically balancing the phases of a three phase arc furnace, the furnace having a vessel containing a molten bath, three electrodes above the bath, and a transformer arrangement composed of three phases, each phase including a winding, the transformer arrangement being connected to the electrode so that each electrode conducts an arc current proportional to the voltage across the winding of a respective phase, by the steps of: matching the voltages between the electrodes and the bath to one another by adjusting the spacing between at least one electrode and the bath; and establishing symmetry among the arc currents by: varying the voltage across at least one phase winding by a selected increment; measuring the arc current amplitude in the electrode associated with the at least one phase winding after each variation step; and repeating the steps of varying and measuring until the differences between the arc current amplitudes of the three electrodes are less than a given value.

11 Claims, 3 Drawing Figures

METHOD AND APPARATUS FOR ELECTRICALLY BALANCING THREE-PHASE ARC DISCHARGE FURNACES

BACKGROUND OF THE INVENTION

The present invention relates to a method and apparatus for balancing the electrical parameters in three-phase arc discharge furnaces, particularly also in order to compensate asymmetries in input inductances, by changing the transformer voltage and/or the electrode height positions.

The three arcs of a three-phase arc discharge furnace each have four variables, or parameters, that are significant to operation, namely: the length of the arc, which is essentially proportional to the arc voltage; the arc current; the arc power; and a value which is a function of the arc length and the arc current and is determinative for the amount of wear of the furnace lining from electrical causes. Normally, it is desired to have these variables in symmetry between, relative to a neutral point, the three windings, i.e. the three arcs. Symmetry between the arcs exists whenever the three arc voltages are identical and the three arc currents are identical. This inevitably makes all of the other arc variables symmetrical as well, i.e. the arc power, the wear coefficient and the arc resistance, if one disregards possible influences from harmonics. However, this symmetry is disturbed, in particular, by asymmetries, or inequalities, in the input inductances. Even furnaces having symmetrical input inductances, as can be realized, for example, by so-called triangulated line conduction, again and again exhibit deviations from symmetry in operation, because the heights of the supporting arms are different, for example, due to the electrodes being clamped in at different lengths and because, during the melting of scrap, irregular scrap charges may position the three electrode tips at unequal distances from the melt or charge.

Although it is possible, if the input inductances are asymmetrical, to regulate the electrode currents to be in symmetry by way of adjusting the electrode heights, this then means that different arc voltages, i.e. arc lengths, must be accepted. With an upper limit for arc power and wear coefficient, this means that possibly only one arc attains these limits, while the other two arcs are not operated at their maximum possible output. If, however, one were to regulate for identical arc voltages, then the currents would become asymmetrical. Possibly, then, the full current intensity can be utilized in only one winding while this is not the case in the other two windings.

SUMMARY OF THE INVENTION

Since the two variables, arc voltage and the arc current, can be put into symmetry, it is an object of the present invention to balance the electrical parameters in a three-phase arc discharge furnace, i.e. the arc voltage and the arc current.

The above and other objects are achieved, according to the invention, by a method and apparatus for electrically balancing the phases of a three phase arc furnace, the furnace having a vessel containing a molten bath, three electrodes above the bath, and a transformer arrangement composed of three phases, each phase including a winding, the transformer arrangement being connected to the electrodes so that each electrode conducts an arc current proportional to the voltage across the winding of a respective phase, by the steps of:

matching the voltages between the electrodes and the bath to one another by adjusting the spacing between at least one electrode and the bath; and establishing symmetry among the arc currents by: varying the voltage across at least one phase winding by a selected increment; measuring the arc current amplitude in the electrode associated with the at least one phase winding after each variation step; and repeating the steps of varying and measuring until the differences between the arc current amplitudes of the three electrodes are less than a given value.

The device for making the currents symmetrical by way of the transformer voltages operates independently of the symmetry of the arc voltages. In special cases, it would thus be possible to achieve symmetrical currents even if the arc voltages were intentionally regulated to be asymmetrical.

In addition to changing the height of one or more electrodes, the transformer voltage is necessary as a second correction value for complete symmetry; a transformer must be used which is able to emit asymmetrical furnace voltages. Jacket, or shell type, transformers, for example, are suitable for such a purpose since they are equipped with a stepping switch with which the voltages of the three phases can be set at different levels.

It is known that arc discharge furnaces constitute mixed inductive-resistive loads whose ohmic resistances can be changed by varying the length of the arc, so that in a transformer whose secondary has a star connection, increasing the voltage in a winding (phase) whose current is to be higher is not sufficient since the transformer star point and the furnace star point are not connected with one another, i.e. no zero component can occur in the current and thus changes in one winding normally result also in changes in the other two windings. For example, it is a known phenomenon in furnaces having coplanar windings, in which the center winding has a considerably lower equivalent circuit inductance than the outer two windings, that with a symmetrical transformer voltage, it is not the center winding, but one of the outer windings, that carries the greatest current. Reversing the sequence of phases causes the greatest current to be moved to the other outer winding which is explained by the differences in mutual coupling between the three high current path loops.

If for every operating state, i.e. any desired height position of the supporting arms, the equivalent circuit inductances of the system were known or easily measurable during operation, it would be possible, by means of computer programs of not insignificant size, to calculate the necessary positions of the three stepping switches and to automatically set them on the basis of the result of this calculation. Although it is possible, in principle, to determine by measurements the equivalent circuit inductances and to set up the appropriate computer programs, such procedure has the drawback that it is very costly. In contradistinction thereto it is possible, according to the present invention, to produce symmetry in the arc currents without constant determinations of the equivalent circuit inductances and thus at the lowest possible cost.

It has also been found that in medium sized and larger furnaces the arc voltage is a function almost exclusively of the arc length, i.e. the height of the electrode tip above the bath (scrap) and hardly at all of the arc current, so that changes in the distribution of current below the three electrodes in response to changes at the transformer stepping switches have practically no effect at all on the electrode height adjustment. This is a further significant advantage of the arc voltage regulation being practically independent of the arc current regulation as provided by the present invention.

According to a further preferred embodiment of the invention, a symmetrical desired current value is given whose deviation from the instantaneous actual current values is determined and correspondingly the voltages are changed in one, two or all three phases. After a change in voltage, the resulting actual current values are measured again and, depending on how they deviate from the desired symmetrical current value, the process is iteratively repeated in every phase until the deviations from the desired current values remaining in the three windings are less than the changes produced by the most recent switching step.

According to a further advantageous feature, a first switching step changes merely the voltage of one winding, if no reference values are present yet for a change in current produced by a switching step. The switching step takes place in that winding in which the current deviation is greatest. The change in current realized in the switched winding is considered the change to be expected during the next switching step. It is assumed in this connection that switching in two windings would make a change of twice that occurring in each one of the switched windings and switching in three windings would make a change three times as large. Tests have shown that such a change in voltage always occurs in the correct direction, i.e. need not be reversed during later changes in voltage even if these should occur in the other windings.

Preferably, a second switching step is performed to change the voltages of those windings in which the currents exhibit a greater deviation from the desired value after the first switching step than would have been expected for the second switching step on the basis of the changes in current in the first switching step and under consideration of the three possibilities that one, two or three winding voltages are changed in the second switching step.

Advantageously, the average change in current in the switched phases is determined before the third switching step and before all further switching steps. The voltage should be changed only in those windings in which, on the basis of the changes in current effected during the immediately preceding switching step, smaller changes in current than the existing deviation from the desired value are to be expected during the next switching step, again in dependence on whether switching occurs in two or three phases.

If, after three or more switching steps, residual asymmetries remain which are smaller than the incremental change in value permitted by the stepping switch of the transformer, these can be finally compensated by a change in the arc voltages toward a slightly asymmetrical setting of the arc lengths in favor of symmetrical current distribution.

If, in contrast to the previous assumption, reference values are already available before the first switching step for the changes in current to be produced by a switching step, then the process can begin with one of the above-described further switching steps.

Preferably, the method will be implemented with a device in which the three-phase arc discharge furnace has a transformer in star connection and includes a stepping switch for each phase. The stepping switch is preferably connected with a pulse generator which advisably includes a memory as well as a difference and average value forming member, possibly in the form of a microcomputer. This pulse generator is connected with a sensor for the currents in the three windings.

Additionally, the microcomputer limits the spread of the three transformer voltages (stepping switch positions) to that permitted by the transformer design.

The present application will be described in greater detail below with reference to practical embodiments.

DESCRIPTION OF THE PREFERRED EMBODIMENTS

Figure 1:
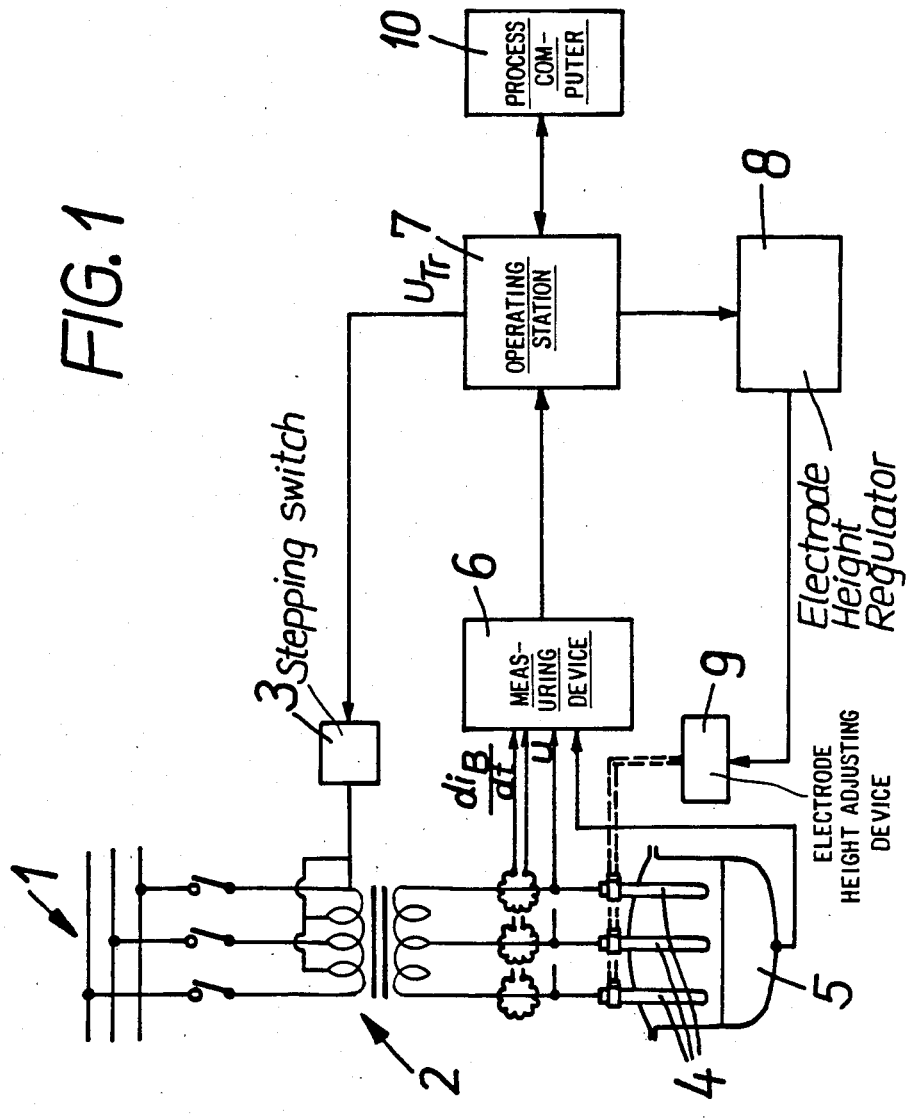
FIG. 1 is a schematic representation of an arc discharge furnace including those parts which are required to implement the method according to the invention.

Current balancing during a melting operation may possibly occur in various ways. When melting scrap, the length of the arc and thus the amount of wear of the furnace lining is frequently without significance because the scrap that is not yet melted shields the furnace lining. Therefore, it would be possible, during the melting of scrap, to achieve the full current carrying capability of the transformer and of the electrodes by way of current balancing by means of electrode adjustments, with current regulation and balancing being able to quickly adapt themselves to changes occurring during melting. The arc voltages will normally be asymmetrical during this operating phase.

After melting, however, conditions in the furnace no longer change quickly. Balancing must now occur, with the required symmetrical arc lengths, by way of the transformer voltages, and it is not a disadvantage in this connection if balancing takes a certain amount of time due to the relatively slow reaction times of the stepping switches. Nevertheless, the time until symmetry is attained should, if possible, not be much longer than the times given by the design of the stepping switch for it to pass through its switching stages.

After measuring the arc currents in each one of the three windings, only that winding voltage is changed, i.e. switched by the transformer stepping switch, in a first switching step, which primarily influences the current that has the greatest deviation from the desired value.

After the first switching step, it is determined, from the changes in current intensity in the windings, in which one of the windings the current intensity must be changed further in the direction toward the desired current value.

Generally, it can be assumed, according to the present invention, that the changes in the three currents caused by a subsequent switching step at the same or identical stepping switches would be of an order of magnitude similar to the preceding switching step. It can further be assumed that, compared to the change if one winding is switched, if two windings are switched, the change will be, at a maximum, twice as large and if switching occurs in three windings, it could be a maximum of three times as large.

Extensive tests have shown that the double or triple value, respectively, will not be reached in practice so that the corresponding switching actions (changes in voltage) can always be effected in this manner, without one winding exceeding the intended setting.

If one calls the desired symmetrical current value $I_S$ and the deviations of the actual currents from this desired value $\Delta I$, the following applies for the corresponding deviation of each current from the desired value:

$$I_{\mu,\nu} = I_S - \Delta I_{\mu,\nu}$$

The first indicium $\mu$ identifies the respective phase, i.e. 1, 2 or 3, while the second indicium $\nu$ is the counted number of switching steps already made. In the starting state, the deviations in the individual phases would therefore be as follows:

$$\Delta I_{1,0} = I_S - I_{1,0}$$

$$\Delta I_{2,0} = I_S - I_{2,0}$$

$$\Delta I_{3,0} = I_S - I_{3,0}$$

Correspondingly, after the first switching step in only one winding, the equation system will be:

$$\Delta I_{1,1} = I_S - I_{1,1}$$

$$\Delta I_{2,1} = I_S - I_{2,1}$$

$$\Delta I_{3,1} = I_S - I_{3,1}$$

Generally, all three $\Delta I$ values change, possibly to different degrees. These changes of the $\Delta I$ values, which will be designated $\delta$ herebelow, in the respectively switched winding now determine whether in the second switching step the voltages are again to be changed only in one or in two or in three windings. In any case, the first switching step, which is quasi a test switching step, shows the order of magnitude of the current change in the windings if the voltage is changed by one step in one of the phases. Thus, this switching step serves to determine the value $$\delta_{\mu,1} = |I_{\mu,0} - I_{\mu,1}|$$

($I_{\mu,\nu}$ = current of the phase having the greatest deviation from the desired value). Strictly speaking, this value is applicable only for the switched phase. However, tests have shown that the deviations in current changes occurring with the normally developing asymmetries in the inductances are not so great that this value could not be used as a reference value for the next necessary change. Thus, the following rule can be established for the change in voltage following the first switching step:

If all three $|\Delta I_{\mu,\nu}| \geq 3\delta_{\mu,1}$, a voltage change may be made simultaneously in three phases with the next switching step. If at least two $|\Delta I_{\mu,1}| \geq 2\delta_{\mu,1}$, switching is allowed in the two phases having the greatest deviation from the desired current value. In all other cases, the voltage must be changed only in the phase having the greatest deviation.

For the further procedure beginning with the third switching step, the average current change per switched phase $\overline{\delta I}_{\nu,n}$ (n = number of switched phases) is utilized. $\overline{\delta I}_{\nu,n}$ results as the average difference of the current deviations $\Delta I_{\nu,n}$ in the switched phases before and after the switching action, divided by the number of switched phases n.

$$\overline{\delta I}_{\nu,n} = \frac{\Sigma |\Delta I_{\mu,\nu-1}| - \Sigma |\Delta I_{\mu,\nu}|}{n}$$

If, for example, the test step indicated that switching was permitted in all three phases, then $\overline{\delta I}_{2,n}$ is determined as follows:

$$\overline{\delta I}_{2,3} = \frac{|\Delta I_{1,1}| + |\Delta I_{2,1}| + |\Delta I_{3,1}| - (|\Delta I_{1,2}| + |\Delta I_{2,2}| + |\Delta I_{3,2}|)}{3}$$

Correspondingly, if, for example, only phases 1 and 3 were switched, the following results:

$$\overline{\delta I}_{2,2} = \frac{|\Delta I_{1,1}| + |\Delta I_{3,1}| - (|\Delta I_{1,2}| + |\Delta I_{3,2}|)}{2}$$

If switching occurred only in phase 1, the expression is as follows:

$$\overline{\delta I}_{2,1} = |\Delta I_{1,1}| - |\Delta I_{1,2}|$$

For the further procedures, the $|\Delta I_{\mu,\nu}|$ values are compared with the determined $\overline{\delta I}_{\nu,n}$ values. If the following applies for all $|\Delta I_{\mu,\nu}|$ values:

$$|\Delta I_{\mu,\nu}| \geq \overline{\delta I}_{\nu,3} \text{ or } |\Delta I_{\mu,\nu}| \geq 3/2 \overline{\delta I}_{\nu,2} \text{ or } |\Delta I_{\mu,\nu}| \geq 3 \overline{\delta I}_{\nu,1}$$

then switching is permitted in all three phases in the subsequent step.

If the following applies for at least two $|\Delta I_{\mu,\nu}|$ values:

$$|\Delta I_{\mu,\nu}| \geq \tfrac{2}{3}\overline{\delta I}_{\nu,3} \text{ or } |\Delta I_{\mu,\nu}| \geq \overline{\delta I}_{\nu,2} \text{ or } |\Delta I_{\mu,\nu}| \geq 2\overline{\delta I}_{\nu,1}$$

then switching may take place in the two phases which have the greatest deviation in currents from the desired value.

In all other cases, the voltage must be changed only in the one phase which has the greatest difference with respect to the desired value.

Correspondingly, it is determined, for the next switching step, in how many phases switching may take place. While for the calculation of the $\overline{\delta I}_{\nu,n}$ values, the values for $\Delta I_{\mu,\nu}$ must be inserted, the direction of the voltage change is determined by the sign of the $\Delta I_{\mu,\nu}$ values. A negative sign means too much current and therefore the voltage must be reduced; correspondingly, a positive sign means not enough current, the voltage in this phase must be increased.

This process is continued until the deviation $\Delta I$ in each of the three phases is less than the last change $\overline{\delta I}$. Residual asymmetries in current can then be compensated only by setting the arc voltages to be asymmetrical.

The reason for this is that the transformer voltages can be changed only in steps. Consequently, in the normal case, there will remain only a slight residual asymmetry in the currents which can no longer be compensated by way of the transformer voltages. If current symmetry—in special cases possibly also a specific asymmetrical current distribution—is to have priority, then this must be considered by means of a certain amount of play in the setting of the arc voltages. This is done by varying the arc voltages in favor of a symmetrical current distribution.

To implement the method according to the invention, a furnace system is advantageously employed as illustrated, in the form of one embodiment thereof, in the drawing Figures.

The furnace system 1 shown in FIG. 1 includes a transformer 2 equipped with a stepping switch 3 for regulating the currents through electrodes 4 above bath 5. Stepping switch 3 includes a separately controllable switch for each transformer phase. A measuring device 6 measures the values $di_B/dt$, a measure of the electrode current, and the voltage u at each electrode and feeds them to an operating station 7 for actuating stepping switch 3 and an electrode height regulator 8. Regulator 8 controls an electrode height adjusting device 9 which can separately vary the height of each electrode. In addition to manual setting, it is also possible to have a process computer 10 take over the function of the operating station.

By means of the described system, it is possible not only to bring the three arc currents into symmetry with one another but also to keep them at a given value. In addition to determining the actually flowing arc currents, it is therefore also necessary to have a given desired current value. This value may either be set manually in operating station 7 or, for automatic operation, it is furnished by process computer 10. Whether the setting is made manually at the operating station or comes by input through process computer 10, is insignificant inasmuch as in both cases the desired values are present in digital form and can thus be processed directly by a computer.

The three actual values of the arc currents are initially present at measuring device 6 in analog form an must be digitalized for processing. Due to the relatively long switching delays of the stepping switch, the three measured current values can be read out sequentially, fed to an A/D converter and written serially into the computer. Finally, the computer must be informed whether at the present time symmetry is desired or not. Therefore, it must be possible to transmit a sufficiently wide width of data between the computer and the stepping switch.

Figure 2:
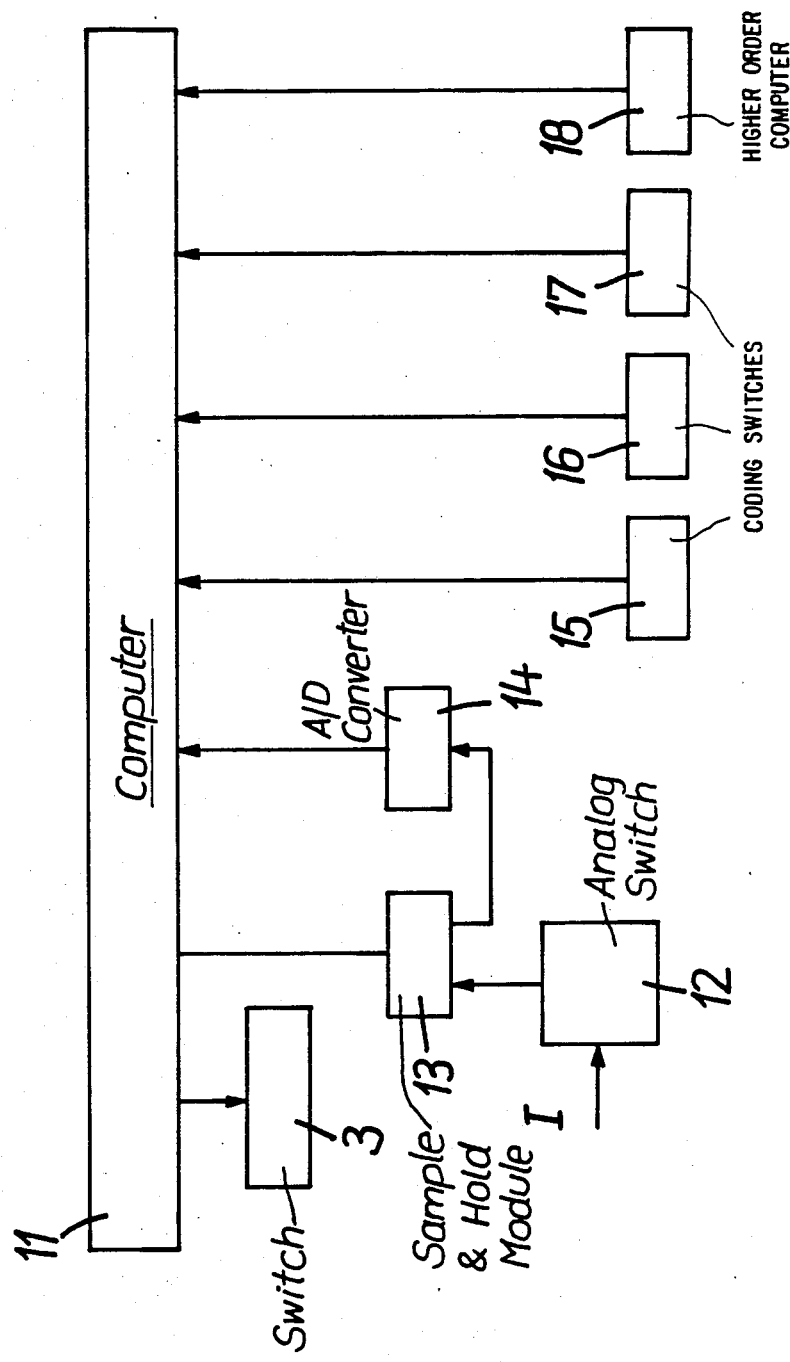
FIG. 2 is a schematic representation of an automatic current balancing circuit for implementing the invention.
Figure 3:
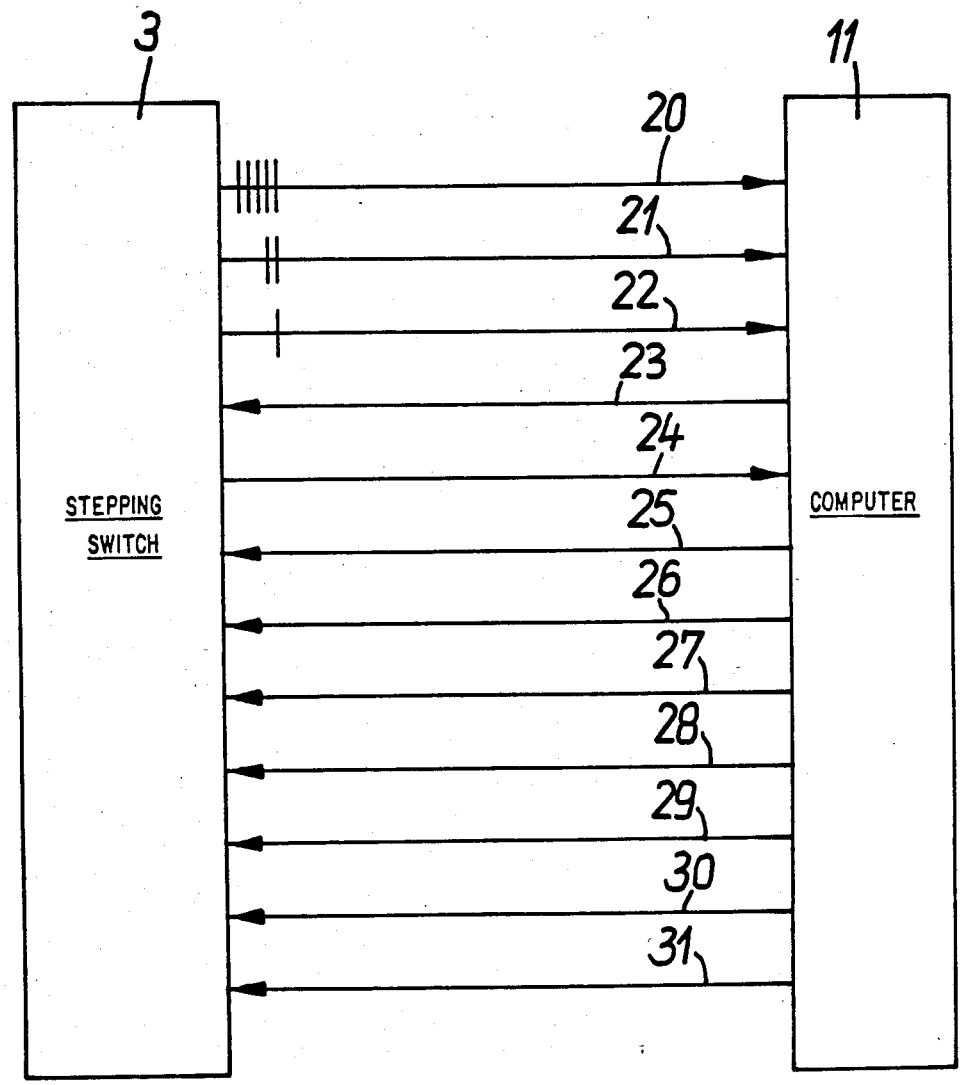
FIG. 3 is a schematic representation of the required data and control lines between the stepping switch and computer of apparatus for implementing the invention.

FIG. 2 shows the interaction between stepping switch 3 and a computer 11, and FIG. 3 shows the connection therebetween in greater detail. The actual current values are fed to an analog switch 12 which feeds the measured values serially to a sample and hold module 13 where they are transferred to an A/D converter 14. This A/D converter 14 feeds digital representations of the measured values to computer 11 which also receives similar representations of the given desired values. In detail, computer 11 is connected to: a coding switch 15 to receive the desired current value; a coding switch 16 to receive corresponding desired values for the minimum deviation between desired and actual values above which stepping switch 3 is to be operated; a coding switch 17 for receiving signals representing the maximum permissible spread between the highest and lowest stepping switch positions (voltage difference); and possibly a higher order computer 18 which provides further program input for computer 11. The functions performed by the system according to FIG. 2 are kept within such limits that they can be handled by a microcomputer 11 which is essentially composed of memory modules, fixed memories (E-PROM) and operating memories (RAM).

FIG. 3 shows the connection of computer 11 with stepping switch 3 via a channel having a parallel capacity of 17 bits. A maximum of 32 stepping switch positions can be regulated which, to be addressed by computer 11, require a width of 5 bits represented by connection 20. To indicate to the computer to which one of the three phases the transmitted switching stage belongs, connection 21 is provided which has a width of two bits to indicate the phase number. A further 1-bit line 22 is required to report that a valid stepping switch position can be read out. Also provided are connections 23 to 31 whose data width is 1 bit in each case for the purposes listed below:

23: requesting the stepping switch position
24: reporting when switching takes place
25 to 27: switching taking place in phases 1 to 3
28 to 30: switching direction in phases 1 to 3
31: switching actuation instruction The above-listed control lines can be used to generate change instructions for the stepping switches, i.e. three possibilities can be realized: no switching, switch up one step and switch down one step. Correspondingly, two control lines are provided for each stepping switch one for the change instruction itself and one which indicates the direction in which the adjustment is to take place. The respective position of the stepping switches, at least the upper and lower end positions of the switches, must be included in the evaluation by the computer, for the following reason. From the given desired current values and the determined actual current values, the computer calculates in which phases and in which direction switching is to take place to attain the desired goal. However, an adjustment instruction must be given only if the corresponding switching action can or may be performed at all. An instruction to switch on in the required direction is permitted only if the corresponding end position has not yet been reached or if, on the part of the transformer, further spreading of the voltage between two phases is still permissible. This can be determined by the absence of the signal "end position" or by a comparison of the momentary position of the stepping switch with the still possible change in the respective direction or with the permissible spread.

After each change in the stepping switches in one, two or all three phases, the computer must first recalculate the new situation so as to derive its next instructions therefrom. It must, however, not be assumed right from the start that the new position will be reported at the same time as the entire switching action is completed. As a precautionary measure, the plans for the system should therefore include a line which indicates the completion of the change in the load switch.

The invention which is the subject of this application is related to the subject matter of the following applications, filed by us on or about the same date as the present application and the subject matter of which is incorporated herein by reference:

Title: METHOD FOR REGULATING THE ELECTRODES IN A FURNACE HAVING FREELY BURNING ELECTRIC ARCS claiming priority of Federal Republic of Germany Application No. P 35 12 178.5 of Apr. 3, 1985; and Title: METHOD AND APPARATUS FOR REGULATING ARC DISCHARGE FURNACE claiming priority of Federal Republic of Germany Application No. P 35 12 189.0 of Apr. 3, 1985.

In present-day systems, the electrode adjustment can be made much more rapidly than the stepwise adjustment of the transformer voltages. The reaction of the system to any electrode adjustment will inevitably be completed before a new switching step can be initiated at the transformer.

During an operating period in which substantial electrode adjustment must be effected, e.g. during melting of a new charge of scrap metal, it is desirable to inhibit adjustment of the transformer voltages as long as one or more electrodes are being moved at a minimum speed.

Higher order computer 18 can be constituted by any known process computer, or even a commercially available personal computer, which has a parallel interface and can be programmed with reasonable ease using an advanced programming language. This computer can be used to transfer desired values to the electrical balancing circuitry and to start the electrical balancing operation.

It will be understood that the above description of the present invention is susceptible to various modifications, changes and adaptations, and the same are intended to be comprehended within the meaning and range of equivalents of the appended claims.

What is claimed is:

1. A method for electrically balancing the phases of a three phase arc furnace, the furnace having a vessel containing a molten bath, three electrodes above the bath, and a transformer arrangement composed of three phases, each phase including a winding, the transformer arrangement being connected to the electrodes so that each electrode conducts an arc current proportional to the voltage across the winding of a respective phase, said method comprising:
    matching the voltages between the electrodes and the bath to one another by adjusting the spacing between at least one electrode and the bath; and
    establishing symmetry among the arc currents by: varying the voltage across at least one phase winding by a selected increment; measuring the arc current amplitude in the electrode associated with the at least one phase winding after each variation step; and repeating said steps of varying and measuring until the differences between the arc current amplitudes of the three electrodes are less than a given value.

2. A method as defined in claim 1 wherein:
    said step of establishing symmetry among the arc currents further comprises providing a representation of a desired arc current amplitude;
    said step of measuring the arc current amplitude comprises determining the difference between the amplitude of the arc current of each electrode and the desired arc current amplitude;
    at least one occurrence of said step of varying is performed on a number of phase windings determined by the result of the preceding occurrence of said measuring step; and
    said step of repeating is performed until the differences determined in said measuring step are less than the changes in current amplitude produced by said varying step.

3. A method as defined in claim 2 wherein the first occurrence of said varying step is performed on only one phase winding.

4. A method as defined in claim 3 wherein the only one phase winding is that winding associated with the arc current amplitude exhibiting the greatest deviation from the desired arc current amplitude.

5. A method as defined in claim 3 wherein the second occurrence of said varying step comprises varying the voltage across each phase winding associated with an arc current whose amplitude, after said first occurrence of said varying step, differs from said desired amplitude by an amount greater than the change in arc current amplitude produced by the first occurrence of said varying step.

6. A method as defined in claim 5 wherein said step of establishing symmetry among the arc current further comprises: determining, after the second occurrence of said varying step, the average change in arc current, as a result of the second occurrence of said varying step in the electrodes connected to those phase windings whose voltages were varied by the second occurrence of said varying step; and performing a third occurrence of said varying step on each phase winding whose associated arc current experienced a change in amplitude as a result of the second occurrence of said varying step which indicates that the third occurrence of the varying step will produce an arc current amplitude change that is less than the difference between the arc current amplitude after the second occurrence of said varying step and the desired arc current amplitude.

7. A method as defined in claim 1 further comprising, after said step of establishing symmetry among the arc currents, compensating any residual arc current asymmetry by varying the spacing between at least one electrode and the bath to produce a compensating asymmetry in the voltages between the electrodes and the bath.

8. A method as defined in claim 1 wherein said step of establishing symmetry among the arc currents is carried out to limit phase winding voltage asymmetry to the extent permitted by the structure of the transformer arrangement.

9. Apparatus for electrically balancing the phases of a three phase arc furnace, the furnace having a vessel containing a molten bath, three electrodes above the bath, and a transformer arrangement composed of three phases connected in a star connection, each phase including a winding, the transformer arrangement being connected to the electrode so that each electrode conducts an arc current proportional to the voltage across the winding of a respective phase, said apparatus comprising:
    means for matching the voltages between the electrodes and the bath to one another by adjusting the spacing between at least one electrode and the bath; and
    means for establishing symmetry among the arc currents, said establishing means including: current sensor means connected for monitoring the amplitude of each arc current; stepping switch means coupled to the transformer arrangement for varying the voltage across each phase winding in increments, and pulse generator means coupled to said stepping switch means and said current sensor means for causing said stepping switch means to vary the voltage across a selected number of the phase windings in dependence on the monitoring result produced by said current sensor means.

10. Apparatus as defined in claim 9 wherein said current sensor means comprise means for providing an indication of the difference between the amplitude of each arc current and a desired arc current amplitude, and means for deriving a representation of the average value of the current differences, whereby the operation is controlled by the value of said representation.

11. Apparatus as defined in claim 9 wherein said means for establishing symmetry comprise control means causing arc current symmetry to be established by: varying the voltage across at least one phase winding by a selected increment; measuring the arc current amplitude in the electrode associated with the at least one phase winding after each variation step; and repeating said steps of varying and measuring until the differences between the arc current amplitudes of the three electrodes are less than a given value.

* * * * *